United States Patent
Li et al.

(10) Patent No.: US 11,479,128 B2
(45) Date of Patent: Oct. 25, 2022

(54) HYBRID POWER VEHICLE RANGE EXTENDER POWER FOLLOWING CONTROL METHOD AND SYSTEM

(71) Applicant: Guangzhou Automobile Group Co., Ltd., Guangdong (CN)

(72) Inventors: Qiang Li, Guangdong (CN); Tao Liu, Guangdong (CN); Haiwei Long, Guangdong (CN); Changhong Wei, Guangdong (CN); Dan Wei, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 109 days.

(21) Appl. No.: 16/341,058

(22) PCT Filed: Oct. 24, 2018

(86) PCT No.: PCT/CN2018/111711
§ 371 (c)(1),
(2) Date: Apr. 10, 2019

(87) PCT Pub. No.: WO2019/179097
PCT Pub. Date: Sep. 26, 2019

(65) Prior Publication Data
US 2020/0406763 A1    Dec. 31, 2020

(30) Foreign Application Priority Data
Mar. 20, 2018 (CN) .......................... 201810230843.9

(51) Int. Cl.
*B60L 50/62* (2019.01)

(52) U.S. Cl.
CPC ......... *B60L 50/62* (2019.02); *B60L 2240/423* (2013.01); *B60L 2240/441* (2013.01); *B60L 2240/443* (2013.01); *B60L 2240/54* (2013.01)

(58) Field of Classification Search
CPC .............. B60L 50/62; B60L 2240/423; B60L 2240/441; B60L 2240/443; B60L 2240/54
See application file for complete search history.

(56) References Cited

U.S. PATENT DOCUMENTS

| | | | | |
|---|---|---|---|---|
| 5,172,784 A | * | 12/1992 | Varela, Jr. | ............... B60L 50/62 180/65.265 |
| 6,536,207 B1 | * | 3/2003 | Kamen | .................... B60K 6/00 60/524 |

(Continued)

FOREIGN PATENT DOCUMENTS

| CN | 102381309 A | 3/2012 |
|---|---|---|
| CN | 102616148 A | 8/2012 |

(Continued)

*Primary Examiner* — Jonathan Ng
*Assistant Examiner* — James J Triggs
(74) *Attorney, Agent, or Firm* — ScienBiziP, P.C.

(57) ABSTRACT

Provided are a hybrid power vehicle range extender power following control method and system. The method includes: when a vehicle satisfies range extender power closed-loop control conditions, an actual charge-discharge power of a power battery and a charge-discharge power expectation value of the power battery are taken as control errors to adjust a total range extender electric power requirement, an engine torque requirement is calculated according to the total range extender electric power requirement, and an engine is controlled to perform the engine torque requirement; and when it is detected that a drive motor electric power suddenly changes and/or a load power suddenly changes, engine quick torque control is activated, and an engine quick torque requirement is taken as a feed-forward value of a generator speed setting controller to control a generator.

16 Claims, 4 Drawing Sheets

(56) References Cited

U.S. PATENT DOCUMENTS

| | | | | |
|---|---|---|---|---|
| 2013/0234503 A1* | 9/2013 | Ichikawa | ................ | H02J 50/80<br>307/104 |
| 2014/0097673 A1* | 4/2014 | Papajewski | ............ | B60L 50/62<br>180/65.245 |
| 2016/0355099 A1* | 12/2016 | Fetzer | .................... | B60L 58/18 |

FOREIGN PATENT DOCUMENTS

| | | | |
|---|---|---|---|
| CN | 104477041 | A | 4/2015 |
| CN | 104477166 | A | 4/2015 |
| CN | 105313711 | A | 2/2016 |
| CN | 105437986 | A | 3/2016 |
| CN | 105922986 | A | 9/2016 |
| CN | 107627864 | A | 1/2018 |
| CN | 108556644 | A | 9/2018 |
| EP | 1211121 | A2 | 6/2002 |
| JP | 2003-92804 | A | 3/2003 |
| JP | 2017178013 | A | 10/2017 |

* cited by examiner

HYBRID POWER VEHICLE RANGE EXTENDER POWER FOLLOWING CONTROL METHOD AND SYSTEM

The present application claims priority to China Patent Application No. 201810230843.9, filed on Mar. 20, 2018 and entitled "Hybrid Power Vehicle Range Extender Power Following Control Method and System", which is hereby incorporated by reference in its entirety.

TECHNICAL FIELD

The present disclosure relates to the technical field of vehicle power, and more particularly to a hybrid power vehicle range extender power following control method and system.

BACKGROUND

The hybrid power vehicle is usually equipped with a range extender. The range extender is composed of an engine, a drive train and a motor. Generally, the engine drives the motor to generate electricity, and the electricity is used to charge a power battery and supply to the motor; when the power battery is only allowed to have lower charge-discharge values, for example, when a rechargeable battery is at a low temperature or the power battery is damaged, an actual power provided by the range extender is required to accurately follow a requirement power to avoid over-charging or over-discharging of the rechargeable battery; when the requirement power changes rapidly and instantaneously, the torque of the engine has a certain delay, which will cause the power battery to be over-charged or over-discharged instantaneously. Therefore, it is necessary to accurately follow the requirement power by the actual power provided by the range extender.

SUMMARY

In order to solve the above technical problem, the present disclosure provides a hybrid power vehicle range extender power following control method and system, which makes an actual power of a range extender follow a requirement power to avoid instantaneous over-charging or over-discharging of a battery.

According to an embodiment of the present disclosure, a hybrid power vehicle range extender power following control method is provided, and the method includes: when a vehicle satisfies range extender power closed-loop control conditions, an actual charge-discharge power of a power battery and a charge-discharge power expectation value of the power battery are taken as control errors to adjust a total range extender electric power requirement, an engine torque requirement is calculated according to the total range extender electric power requirement, and an engine is controlled to perform the engine torque requirement; when it is detected that a drive motor electric power suddenly changes and/or a load power suddenly changes, engine quick torque control is activated, the engine responds to an engine quick torque requirement, and the engine quick torque requirement is taken as a feed-forward value of a generator speed setting controller to control a generator.

In an embodiment, the method of judging that a vehicle satisfies range extender power closed-loop control conditions specifically includes: It is judged whether the following conditions are satisfied simultaneously: bus voltage and bus current signals fed back by the power battery are valid; an allowable charge-discharge power of the power battery is less than a charge-discharge power threshold; and the vehicle is in a extended range control mode.

In an embodiment, if it is detected that a drive motor electric power suddenly changes, it is detected that an accelerator change slope is greater than an accelerator slope threshold; and if it is detected that a load power suddenly changes, it is detected that a change slope of a load power consumption value is greater than a load power slope threshold.

In an embodiment, the step of taking actual charge-discharge power of a power battery and a charge-discharge power expectation value of the power battery as control errors to adjust a total range extender electric power requirement specifically includes: a bus current value and a bus voltage value of the power battery are acquired, and an actual charge-discharge power of the power battery is calculated according to the bus current value and the bus voltage value; a first control error is calculated according to the charge-discharge power expectation value of the power battery and the actual charge-discharge power of the power battery, and low-pass filtering is performed on the first control error to obtain a second control error; a range expander generated power requirement compensation value is calculated according to the second control error; and a total range extender electric power requirement is calculated according to the range expander generated power requirement compensation value, a drive motor electric power requirement and a load power requirement.

In an embodiment, the step of calculating a range expander generated power requirement compensation value according to the second control error specifically includes: a range expander generated power requirement compensation value is calculated by taking the second control error as an input; the range expander generated power requirement compensation value is limited within the range of a generated power requirement compensation threshold; It is judged whether the range expander generated power requirement compensation value remains at a threshold for a preset period of time; If no, slope algorithm processing is performed on the range expander generated power requirement compensation value.

In an embodiment, the method further includes: If the range expander generated power requirement compensation value remains at a threshold for a preset period of time, it is defined to be a fault state.

In an embodiment, the step of activating engine quick torque control, responding to the engine quick torque requirement by the engine and taking the engine quick torque requirement as a feed-forward value of a generator speed setting controller to control a generator specifically includes: the engine quick torque control is activated, and an engine quick torque control flag is set; a total range extender electric power requirement is calculated according to the charge-discharge power threshold of the power battery, the drive motor electric power and the load power, and an engine quick torque requirement is calculated according to the total range extender electric power requirement; the engine quick torque control flag, an engine conventional torque requirement and the engine quick torque requirement are sent to the engine; and according to the setting of the engine quick torque control flag, the engine responds to the engine quick torque requirement, and the engine quick torque requirement is taken as a feed-forward value of a generator speed setting controller to control a generator.

In an embodiment, the method further includes: when time for activating the engine quick torque control exceeds a time threshold or a difference between the engine conventional torque requirement and the engine quick torque requirement is less than a preset value, the engine quick torque control is deactivated; an engine quick torque flag is reset; the engine quick torque control flag, an engine conventional torque requirement and the engine quick torque requirement are sent to the engine; and the engine responds to the engine conventional torque requirement, and the engine conventional torque requirement is taken as a feed-forward value of a generator speed setting controller to control a generator.

According to an embodiment of the present disclosure, a hybrid power vehicle range extender power following control system is provided, and the system includes: a first execution unit, configured to take, when a vehicle satisfies range extender power closed-loop control conditions, an actual charge-discharge power of a power battery and a charge-discharge power expectation value of the power battery as control errors to adjust a total range extender electric power requirement, calculate an engine torque requirement according to the total range extender electric power requirement, and control an engine to perform the engine torque requirement; and a second execution unit, configured to activate, when it is detected that a drive motor electric power suddenly changes and/or a load power suddenly changes, engine quick torque control, respond to an engine quick torque requirement by the engine, and take the engine quick torque requirement as a feed-forward value of a generator speed setting controller to control a generator.

In an embodiment, the second execution unit is specifically configured to: activate engine quick torque control, and set an engine quick torque control flag; calculate a total range extender electric power requirement according to the charge-discharge power threshold of the power battery, the drive motor electric power and the load power, and calculate an engine quick torque requirement according to the total range extender electric power requirement; send the engine quick torque control flag, an engine conventional torque requirement and the engine quick torque requirement to the engine; and according to the setting of the engine quick torque control flag, respond to the engine quick torque requirement by the engine, and take the engine quick torque requirement as a feed-forward value of a generator speed setting controller to control a generator.

The above embodiments provided by the present disclosure have the following beneficial effects:

The present disclosure proposes a range extender power following method for the transient and steady states of a hybrid power vehicle range extender from the load characteristic point of view. As long as a vehicle satisfies range extender power closed-loop control conditions regardless of the steady state or the transient state, a range extender power follows a load power by controlling errors through a PI closed-loop controller, and a charge-discharge power of a power battery is limited within an allowable range; in the transient case, by identifying the sudden change of the load power, an engine quick torque control function is activated to optimize a feed-forward value of a generator speed setting controller, thereby eliminating or reducing the over-charge or over-discharge of the power battery, prolonging the service life of the power battery and ensuring the running quality of the vehicle.

DETAILED DESCRIPTION OF THE EMBODIMENTS

The improvement of the conventional art of the present disclosure lies in that, from both transient and steady states, a range extender power following control method and system are proposed for different vehicle load power change characteristics, so that a range extender power follows a requirement power and avoids over-charging and over-discharging of a power battery, which will be further described below with reference to the accompanying drawings and embodiments.

Figure 1:
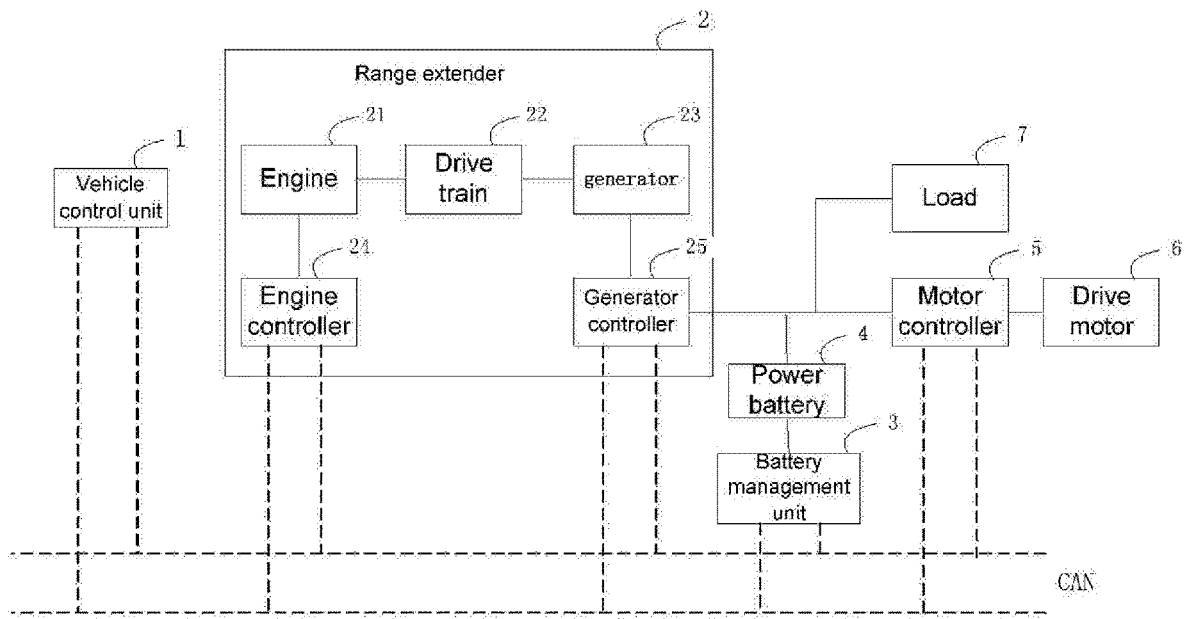
FIG. 1 is a schematic diagram of a working principle of a range extended hybrid power vehicle according to an embodiment of the present disclosure.

As shown in FIG. 1, a range extended hybrid power vehicle provided by the present disclosure includes: a vehicle control unit 1, a range extender 2, a battery management unit 3, a power battery 4, a motor controller 5, a drive motor 6, and a load 7. The vehicle control unit 1 is a core control unit for a hybrid power vehicle. The range extender 2 is a power system of the hybrid power vehicle, including an engine 21, a drive train 22, a generator 23, an engine controller 24, and a generator controller 25. The power battery 3 is managed by the battery management unit 4. The battery management unit 4 may detect the voltage and current of the power battery 3. The motor controller 5 controls the operation of the drive motor 6. The load 7 refers to an electric load for the hybrid power vehicle, including an air conditioner, a heater, etc. The drive motor 6 and the load 7 together constitute the electric load for the hybrid power vehicle.

The vehicle control unit 1, the engine controller 24, the generator controller 25, the battery management unit 4, and the motor controller 5 communicate via a Controller Area Network (CAN).

Figure 2:
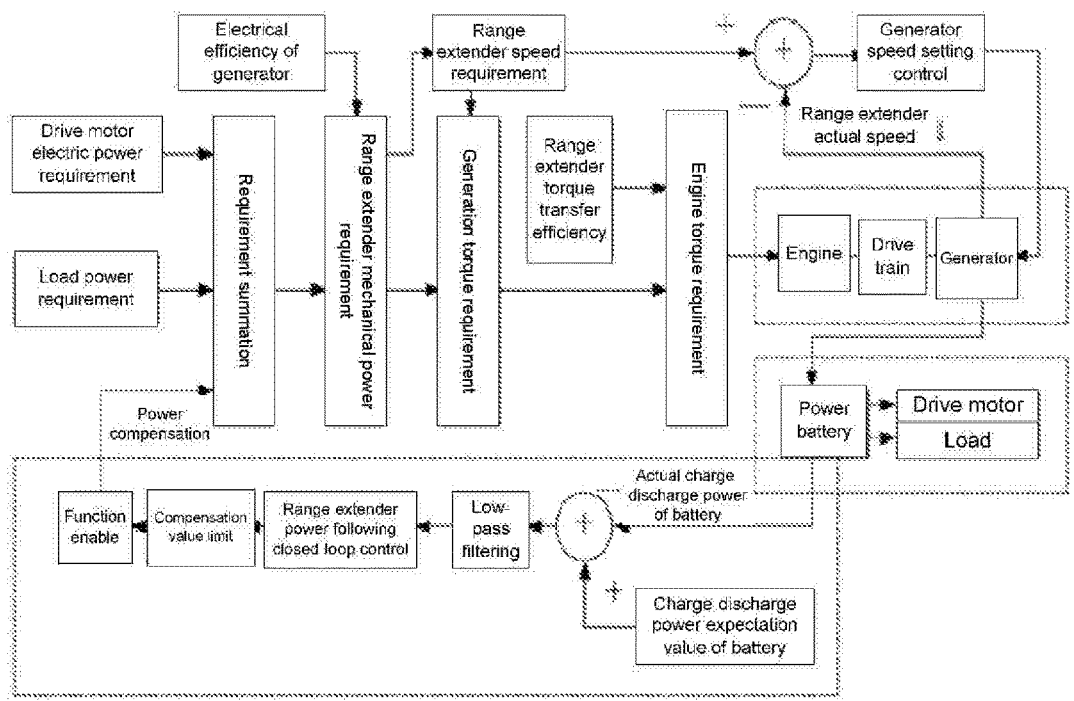
FIG. 2 is a flowchart of hybrid power vehicle range extender parameter control and calculation according to an embodiment of the present disclosure.

A range extender requirement power is calculated according to an electric power requirement of the drive motor, a load power requirement and an electrical efficiency of the generator. A range extender speed requirement and a generation torque requirement are further calculated according to the range extender requirement power, and an engine torque requirement is calculated finally according to the generation torque requirement of the range extender and a torque transfer efficiency of the range extender to control the operation of the engine. The speed of the range extender is subjected to closed-loop control by controlling a generator torque. During the control process, the calculation of the load power, the mechanical efficiency of the drive motor, the electrical efficiency of the generator and the torque transfer efficiency of the range extender all have a certain error, that is, a steady-state error, so that the actual power of the range extender is difficult to follow the requirement power. When the actual power of the range extender cannot follow the requirement power, the battery will be over-charged or over-discharged. FIG. 2 shows a parameter control and calculation process of a hybrid power vehicle range extender in the present embodiment, for controlling the aforementioned steady-state error.

Figure 3:
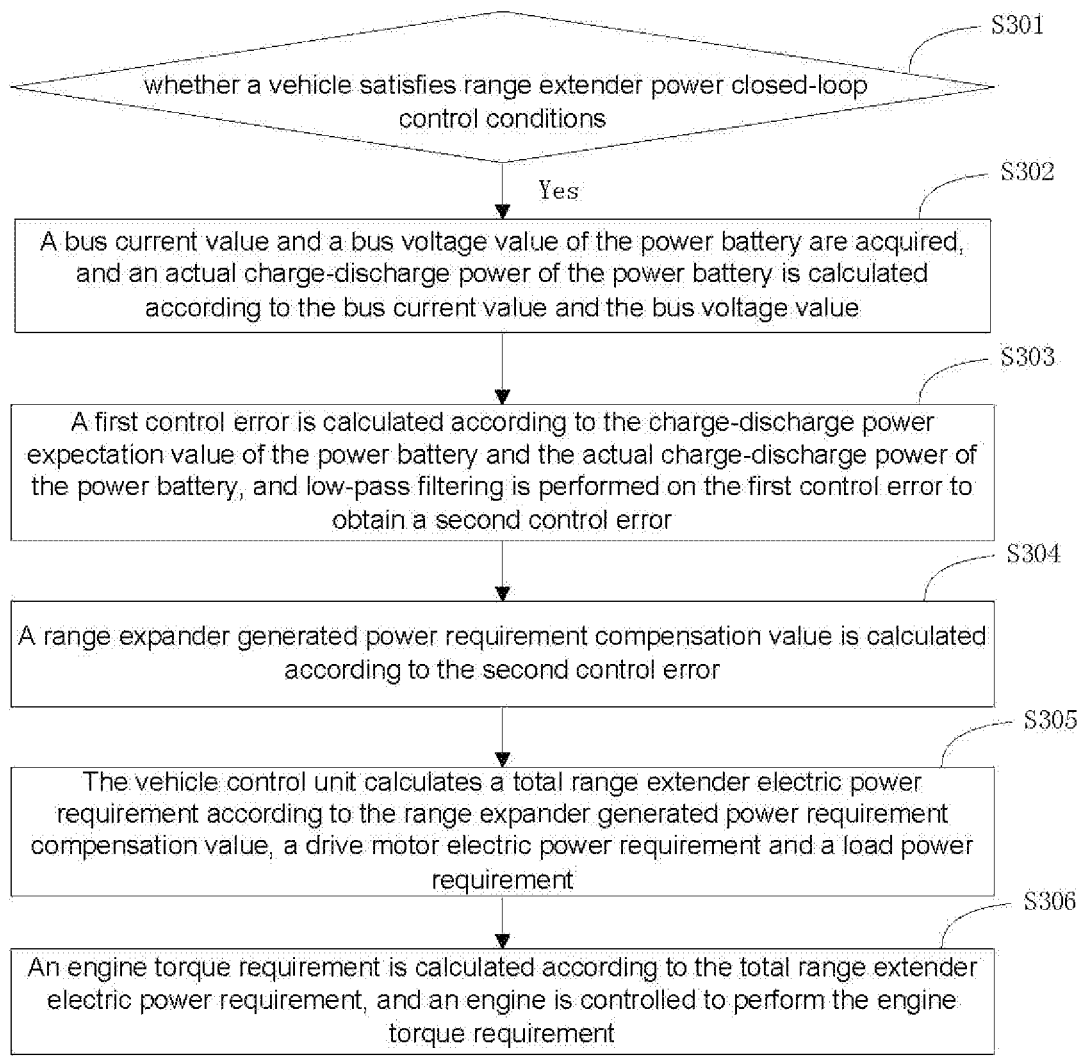
FIG. 3 is a flowchart of a hybrid power vehicle range extender power following control method according to an embodiment of the present disclosure.

As shown in FIG. 3, a hybrid power vehicle range extender power following control method of the present embodiment includes the steps as follows.

At step S301, it is judged whether a vehicle satisfies range extender power closed-loop control conditions.

Specifically, if the vehicle needs to satisfy range extender power closed-loop control conditions, it is necessary to simultaneously satisfy the following three conditions:

It is detected that bus voltage and bus current signals fed back by the power battery are valid.

An allowable charge-discharge power of the power battery is less than a charge-discharge power threshold, where the threshold is determined by engineer test and set in vehicle parameters.

The vehicle is in a extended range control mode.

If the above three conditions are simultaneously satisfied, it is determined that the range extender power closed-loop control conditions are satisfied. If one of the conditions is not satisfied, it, is determined that the vehicle does not satisfy the conditions.

At step S302, if so, a bus current value and a bus voltage value of the power battery are acquired, and an actual charge-discharge power of the power battery is calculated according to the bus current value and the bus voltage value.

It is to be noted that the power battery is managed by the battery management unit, and a bus current value and a bus voltage value of the power battery may be acquired from the battery management unit.

At step S303, a first control error is calculated according to the charge-discharge power expectation value of the power battery and the actual charge-discharge power of the power battery, and low-pass filtering is performed on the first control error to obtain a second control error.

It is to be noted that the charge-discharge power expectation value of the power battery is preset by an engineer. The charge-discharge power expectation value needs to be set small, so that subsequent over-charge or over-discharge can be effectively controlled.

A difference between the charge-discharge power expectation value and the actual charge-discharge power of the power battery is the first control error here. Here, "first" and "second" are not used to represent the order, just to distinguish the control errors, and the purpose of low-pass filtering is to limit error sizes.

If it is determined in step S301 that the vehicle no longer satisfies the range extender power closed-loop control conditions, the second control error here maintains a current value until the vehicle satisfies the conditions again.

At step S304, a range expander generated power requirement compensation value is calculated according to the second control error.

The range expander generated power requirement compensation is determined according to methods of range extender power closed-loop control and compensation power limitation.

At step S305, the vehicle control unit calculates a total range extender electric power requirement according to the range expander generated power requirement compensation value, a drive motor electric power requirement and a load power requirement.

The total range extender electric power requirement takes into account the generated power requirement compensation value. The purpose is to adjust the total range extender power to be consistent with the actual requirement power, and not to charge and discharge the power battery as much as possible. If the power battery is in a state of charge, the range extender generated power requirement compensation value is subtracted from the sum of a drive motor requirement electric power requirement and a load power requirement. If the power battery is in a state of discharge, it is indicated that an original range extender provision power is not sufficient, and it is necessary to add the range extender generated power requirement compensation value to the sum of the drive motor requirement electric power requirement and the load power requirement. The total range extender electric power requirement is adjusted according to the range extender generated power requirement compensation value.

The purpose of step S302 to step S305 is to take actual charge-discharge power of a power battery and a charge-discharge power expectation value of the power battery as control errors to adjust a total range extender electric power requirement.

At step S306, an engine torque requirement is calculated according to the total range extender electric power requirement, and an engine is controlled to perform the engine torque requirement.

The first error is obtained by calculating the actual charge-discharge power of the power battery and calculating the charge-discharge power expectation value of the power battery, and is processed to obtain the range extender generated power requirement compensation value. The total range extender electric power requirement is optimized by the compensation value, and the engine torque is controlled by the total range extender electric power requirement, so that the actual power of the range extender is closer to the requirement power, thereby achieving the purpose of power following, and effectively avoiding over-charging and over-discharging of a battery.

Figure 4:
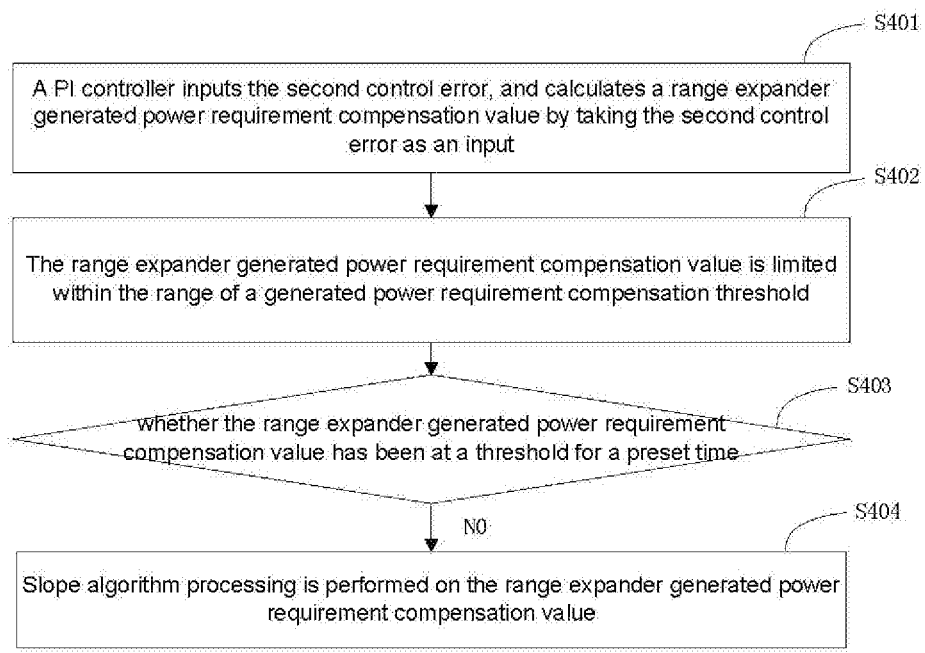
FIG. 4 is a flowchart of a method for calculating a range extender generated power requirement compensation according to an embodiment of the present disclosure.

As shown in FIG. 4, the method for calculating a range expander generated power requirement compensation value according to the second control error specifically includes the steps as follows.

At step S401, a PI controller inputs the second control error, and calculates a range expander generated power requirement compensation value by taking the second control error as an input.

The method for using a PI controller to input the second control error and calculating a range expander generated power requirement compensation value by taking the second control error as an input specifically includes: inputting the second control error in the PI controller, calculating parameters KP and KI of the PI controller by a look-up table algorithm and according to the second control error, and calculating a range expander generated power requirement compensation value according to the second control error and the parameters KP and KI. If the conditions are satisfied again after the vehicle satisfies the range extender power closed-loop control conditions, the PI input value is a current value retained by the second control error. Step S401 corresponds to the step of range extender power following closed-loop control of FIG. 2.

At step S402, the range expander generated power requirement compensation value is limited within the range of a generated power requirement compensation threshold.

If the range extender generation requirement compensation value is greater than the generated power requirement compensation threshold, the range extender generation requirement compensation value is replaced with the generated power requirement compensation threshold. If the range extender generation requirement compensation value is less than the generated power requirement compensation threshold, the range extender generation requirement compensation value is not changed.

At step S403, it is judged whether the range expander generated power requirement compensation value remains at a threshold for a preset period of time.

If the range extender generation requirement compensation value is equal to the threshold all the time, it is indicated that the range extender power control calculation process has a large deviation, it can be determined to be a fault state, and vehicle fault prompt information can be sent. For example, the above deviation may be caused by an excessively large engine torque response deviation.

At step S404, if no, slope algorithm processing is performed on the range expander generated power requirement compensation value.

The purpose of performing slope algorithm processing on the range expander generated power requirement compensation value is to make the range expander generated power requirement compensation value slowly change, so as to avoid influence on the stability of a vehicle system caused by the sudden change of the range extender power.

Figure 5:
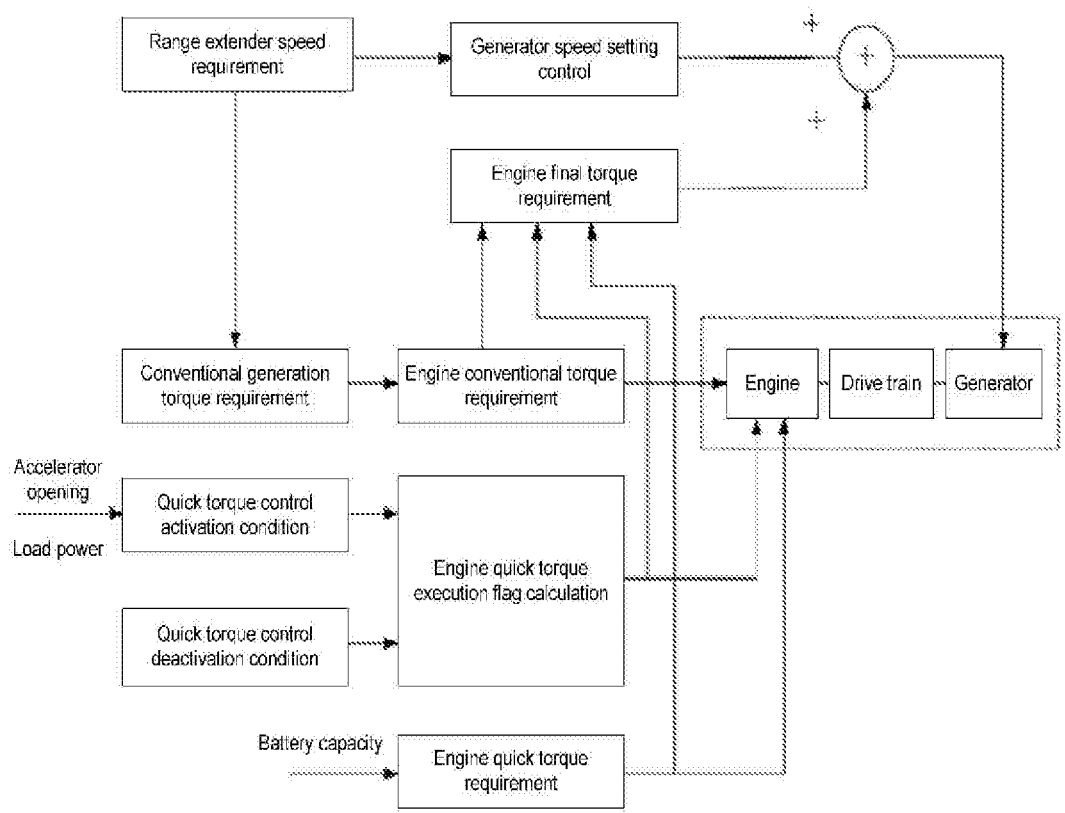
FIG. 5 is a flowchart of calculation and control of various parameters during working of a range extender according to an embodiment of the present disclosure.

FIG. 5 shows the calculation and control process of each parameter when the range extender is in a transient condition in the present embodiment, where the transient condition refers to the sudden change of the electric load of the range extender. It is to be noted that the control of the present embodiment under transient conditions is not repulsive to the aforementioned closed-loop control for a steady-state error. As long as the range extender power closed-loop control conditions are satisfied, the aforementioned closed-loop control for the steady-state error is activated and continued regardless of whether it is in transient conditions at this time. Moreover, a control result under transient conditions is also superimposed with the result of closed-loop control of the steady-state error to jointly realize the range extender power following control.

When the vehicle detects sudden change in the electric load, that is, the sudden change in an accelerator opening and/or a load power in FIG. 5, the sudden change in the accelerator opening is actually a sudden change in the drive motor power, which can be identified by the accelerator slope change; the change slope of the load power consumption value is used to identify a sudden change in the load power; if a sudden change in the drive motor power and/or a sudden change in the load power is detected, it is determined that the range extender is in a transient condition.

Under normal circumstances, when the drive motor power, suddenly changes or the load power suddenly changes, if the engine cannot respond to the torque requirement quickly, the power of the range extender will not change, and the power battery will be over-charged or over-discharged instantaneously.

Figure 6:
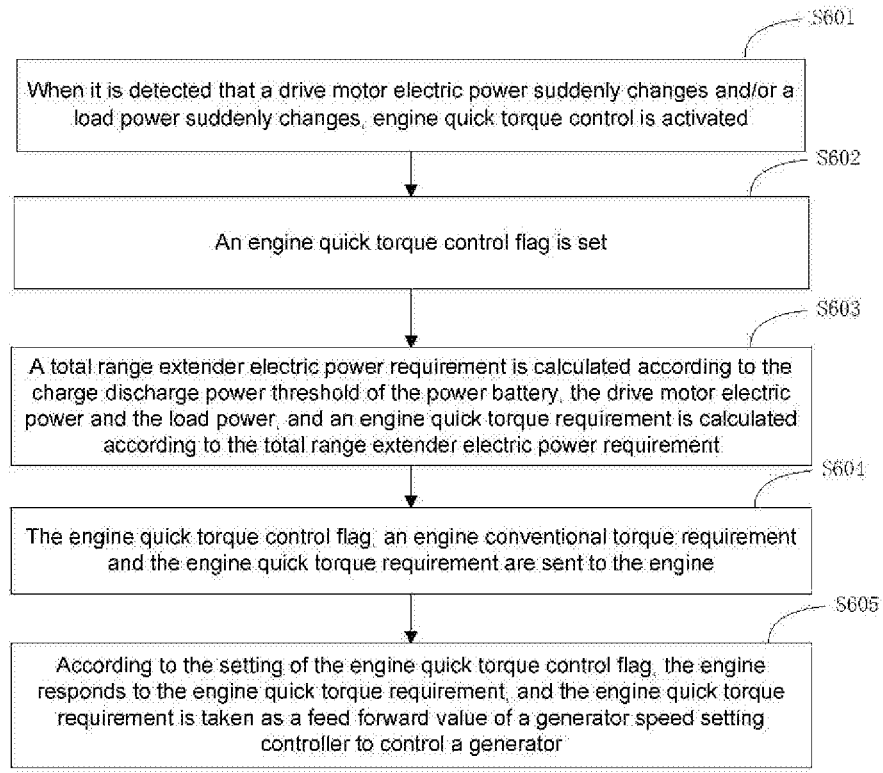
FIG. 6 is a flowchart of a hybrid power vehicle range extender power following control method under instantaneous conditions according to an embodiment of the present disclosure.

As shown in FIG. 6, a hybrid power vehicle range extender power following control method includes the steps as follows.

The method is applicable to the condition that the range extender operates in a transient condition, that is, the electric load requirement suddenly changes.

At step S601, when it is detected that a drive motor electric power suddenly changes and/or a load power suddenly changes, engine quick torque control is activated.

Specifically, the vehicle control unit may acquire an accelerator signal by an accelerator pedal opening signal, or may acquire an accelerator signal by the engine controller. When it is detected that an accelerator change slope is greater than an accelerator slope threshold, it is determined that the drive motor power suddenly changes, when it is detected that a change slope of a load power consumption value is greater than a load power slope threshold, it is determined that the load power suddenly changes, and the accelerator slope threshold and the load power slope threshold are preset in the system by test.

At step S602, an engine quick torque control flag is set.

Specifically, the engine quick torque control flag has two states, namely a set state and a reset state.

The purpose of step S602 is to record the working condition of the engine as a quick torque control state.

At step S603, a total range extender electric power requirement is calculated according to the charge-discharge power threshold of the power battery, the drive motor electric power and the load power, and an engine quick torque requirement is calculated according to the total range extender electric power requirement.

At step S604, the engine quick torque control flag, an engine conventional torque requirement and the engine quick torque requirement are sent to the engine.

It is to be noted that the engine conventional torque requirement is an engine conventional torque requirement in general conditions, which can be calculated by a conventional generation torque requirement.

At step S605, according to the setting of the engine quick torque control flag, the engine responds to the engine quick torque requirement, and the engine quick torque requirement is taken as a feed-forward value of a generator speed setting controller to control a generator.

Through the above method, the requirement that the engine torque responds quickly to the engine torque change when the electric load suddenly changes is realized, and the generator torque requirement is used as a feed-forward value to control the motor. Moreover, on the basis of the range extender closed-loop control, the engine torque is quickly adjusted, so that the entire range extender power follows the power of the electric load, thereby avoiding over-charging and over-discharging of the power battery.

Further, when time for activating the engine quick torque control exceeds a time threshold or a difference between the engine conventional torque requirement and the engine quick torque requirement is less than a preset value, the engine quick torque control is deactivated.

The engine quick torque control flag is reset.

The engine quick torque control flag, an engine conventional torque requirement and the engine quick torque requirement are sent to the engine.

The engine responds to the engine conventional torque requirement, and the engine conventional torque requirement is taken as a feed-forward value of a generator speed setting controller to control a generator.

When the engine quick torque control time exceeds the preset time, or the engine conventional torque requirement is close to the engine quick torque requirement, the engine is adjusted back to normal conditions, the engine torque control flag is reset, and the engine is controlled by the engine conventional torque requirement as a feed-forward value of the motor speed setting controller to control the motor.

Figure 7:
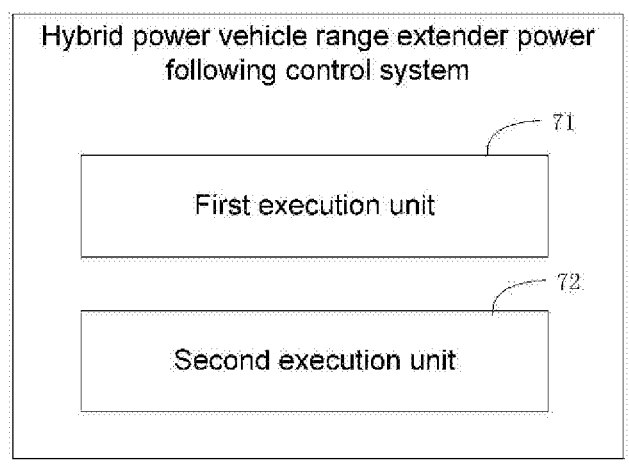
FIG. 7 is a structure diagram of a hybrid power vehicle range extender power following control system according to an embodiment of the present disclosure.

As shown in FIG. 7, a hybrid power vehicle range extender power following control system includes: a first execution unit 71 and a second execution unit 72.

The first execution unit 71 is configured to take, when a vehicle satisfies range extender power closed-loop control conditions, an actual charge-discharge power of a power battery and a charge-discharge power expectation value of the power battery as control errors to adjust a total range extender electric power requirement, calculate an engine torque requirement according to the total range extender electric power requirement, and control an engine to perform the engine torque requirement.

The second execution unit 72 is configured to activate, when it is detected that a drive motor electric power suddenly changes and/or a load power suddenly changes, engine quick torque control, respond to an engine quick torque requirement by the engine, and take the engine quick torque requirement as a feed-forward value of a generator speed setting controller to control a generator.

The second execution unit is specifically configured to:

activate engine quick torque control, and set an engine quick torque control flag;

calculate a total range extender electric power requirement according to the charge-discharge power threshold of the power battery, the drive motor electric power and the load power, and calculate an engine quick torque requirement according to the total range extender electric power requirement;

send the engine quick torque control flag, an engine conventional torque requirement and the engine quick torque requirement to the engine; and according to the setting of the engine quick torque control flag, respond to the engine quick torque requirement by the engine, and take the engine quick torque requirement as a feed-forward value of a generator speed setting controller to control a generator.

The implementation of the present disclosure has the following beneficial effects:

The present disclosure proposes a range extender power following method for the transient and steady states of a hybrid power vehicle range extender from the load characteristic point of view. As long as a vehicle satisfies range extender power closed-loop control conditions regardless of the steady state or the transient state, a range extender power follows a load power by controlling errors through a PI closed-loop controller, and a charge-discharge power of a power battery is limited within an allowable range; in the transient case, by identifying the sudden change of the load power, an engine quick torque control function is activated to optimize a feed-forward value of a generator speed setting controller, thereby eliminating or reducing the over-charge or over-discharge of the power battery, superposing the range extender closed-loop control effects, prolonging the service life of a battery and ensuring the running quality of the vehicle.

Those of ordinary skill in the art can understand that all or part of the processes in the above method embodiments may be implemented by a computer program to instruct related hardware, and the program may be stored in a computer-readable storage medium. When the program is executed, the flow of each method embodiment as described above may be included. The storage medium may be a magnetic disk, an optical disk, a Read-Only Memory (ROM), or a Random Access Memory (RAM).

The above is a further detailed description of the present disclosure in connection with the specific preferred embodiments, and the specific embodiments of the present disclosure are not limited to the description. A number of simple derivations or replacements may be made by those of ordinary skill in the art without departing from the conception of the present disclosure, and all fall within the scope of protection of the present disclosure.

What is claimed is:

1. A hybrid power vehicle range extender power following control method, comprising:

when a vehicle satisfies range extender power closed-loop control conditions, taking an actual charge-discharge power of a power battery and a charge-discharge power expectation value of the power battery as control errors to adjust a total range extender electric power requirement, calculating an engine torque requirement according to the total range extender electric power requirement, and controlling an engine to perform the engine torque requirement; and when it is detected that a drive motor electric power changes or a load power changes, activating engine quick torque control, and taking an engine quick torque requirement as a feed-forward value of a generator speed setting controller to control a generator.

2. The method as claimed in claim 1, wherein the method of judging that a vehicle satisfies range extender power closed-loop control conditions comprises:

judging whether the following conditions are satisfied simultaneously:

bus voltage and bus current signals fed back by the power battery are valid;

an allowable charge-discharge power of the power battery is less than a charge-discharge power threshold; and the vehicle is in a extended range control mode.

3. The method as claimed in claim 1, wherein if it is detected that a drive motor electric power changes, it is detected that an accelerator change slope is greater than an accelerator slope threshold; and if it is detected that a load power changes, it is detected that a change slope of a load power consumption value is greater than a load power slope threshold.

4. The method as claimed in claim 1, wherein taking actual charge-discharge power of a power battery and a charge-discharge power expectation value of the power battery as control errors to adjust a total range extender electric power requirement specifically comprises:

acquiring a bus current value and a bus voltage value of the power battery, and calculating an actual charge-discharge power of the power battery according to the bus current value and the bus voltage value;

calculating a first control error according to the charge-discharge power expectation value of the power battery and the actual charge-discharge power of the power battery, and performing low-pass filtering on the first control error to obtain a second control error;

calculating a range expander generated power requirement compensation value according to the second control error; and calculating a total range extender electric power requirement according to the range expander generated power requirement compensation value, a drive motor electric power requirement and a load power requirement.

5. The method as claimed in claim 4, wherein calculating a range expander generated power requirement compensation value according to the second control error specifically comprises:

calculating a range expander generated power requirement compensation value by taking the second control error as an input;

limiting the range expander generated power requirement compensation value within the range of a generated power requirement compensation threshold;

judging whether the range expander generated power requirement compensation value remains at a threshold for a preset time; and if no, performing slope algorithm processing on the range expander generated power requirement compensation value.

6. The method as claimed in claim 5, further comprising:
if the range expander generated power requirement compensation value remains at a threshold for a preset time, determining to be a fault state.

7. The method as claimed in claim 1, wherein the step of activating engine quick torque control and taking an engine quick torque requirement as a feed-forward value of a generator speed setting controller to control a generator specifically comprises:

activating engine quick torque control, and setting an engine quick torque control flag;

calculating a total range extender electric power requirement according to the charge-discharge power threshold of the power battery, the drive motor electric power and the load power, and calculating an engine quick torque requirement according to the total range extender electric power requirement;

sending the engine quick torque control flag, an engine conventional torque requirement and the engine quick torque requirement to the engine; and according to the setting of the engine quick torque control flag, responding to the engine quick torque requirement by the engine, and taking the engine quick torque requirement as a feed-forward value of a generator speed setting controller to control a generator.

8. The method as claimed in claim 7, further comprising:
when time for activating the engine quick torque control exceeds a time threshold or a difference between the engine conventional torque requirement and the engine quick torque requirement is less than a preset value, deactivating the engine quick torque control;

resetting an engine quick torque flag;

sending the engine quick torque control flag, an engine conventional torque requirement and the engine quick torque requirement to the engine; and responding to the engine conventional torque requirement by the engine, and taking the engine conventional torque requirement as a feed-forward value of a generator speed setting controller to control a generator.

9. A hybrid power vehicle range extender power following control system, comprising:

a vehicle control unit, configured to take, when a vehicle satisfies range extender power closed-loop control conditions, an actual charge-discharge power of a power battery and a charge-discharge power expectation value of the power battery as control errors to adjust a total range extender electric power requirement, calculate an engine torque requirement according to the total range extender electric power requirement, and control an engine to perform the engine torque requirement; and the vehicle control unit further, configured to activate, when it is detected that a drive motor electric power changes or a load power changes, engine quick torque control, and take an engine quick torque requirement as a feed-forward value of a generator speed setting controller to control a generator.

10. The system as claimed in claim 9, wherein the vehicle control unit is specifically configured to:

activate engine quick torque control, and set an engine quick torque control flag;

calculate a total range extender electric power requirement according to the charge-discharge power threshold of the power battery, the drive motor electric power and the load power, and calculate an engine quick torque requirement according to the total range extender electric power requirement;

send the engine quick torque control flag, an engine conventional torque requirement and the engine quick torque requirement to the engine; and according to the setting of the engine quick torque control flag, respond to the engine quick torque requirement by the engine, and take the engine quick torque requirement as a feed-forward value of a generator speed setting controller to control a generator.

11. The system as claimed in claim 9, wherein the operation of judging that a vehicle satisfies range extender power closed-loop control conditions is performed in the following way:

judging whether the following conditions are satisfied simultaneously:

bus voltage and bus current signals fed back by the power battery are valid;

an allowable charge-discharge power of the power battery is less than a charge-discharge power threshold; and the vehicle is in a extended range control mode.

12. The system as claimed in claim 9, wherein if it is detected that a drive motor electric power changes, it is detected that an accelerator change slope is greater than an accelerator slope threshold; and if it is detected that a load power changes, it is detected that a change slope of a load power consumption value is greater than a load power slope threshold.

13. The system as claimed in claim 9, wherein the operation of taking actual charge-discharge power of a power battery and a charge-discharge power expectation value of the power battery as control errors to adjust a total range extender electric power requirement is performed in the following way:

acquiring a bus current value and a bus voltage value of the power battery, and calculating an actual charge-discharge power of the power battery according to the bus current value and the bus voltage value;

calculating a first control error according to the charge-discharge power expectation value of the power battery and the actual charge-discharge power of the power battery, and performing low-pass filtering on the first control error to obtain a second control error;

calculating a range expander generated power requirement compensation value according to the second control error; and calculating a total range extender electric power requirement according to the range expander generated power requirement compensation value, a drive motor electric power requirement and a load power requirement.

14. The system as claimed in claim 13, wherein the operation of calculating a range expander generated power requirement compensation value according to the second control error is performed in the following way:

calculating a range expander generated power requirement compensation value by taking the second control error as an input;

limiting the range expander generated power requirement compensation value within the range of a generated power requirement compensation threshold;

judging whether the range expander generated power requirement compensation value remains at a threshold for a preset time; and if no, performing slope algorithm processing on the range expander generated power requirement compensation value.

15. The system as claimed in claim 14, the system is further configured to:

if the range expander generated power requirement compensation value remains at a threshold for a preset time, determine to be a fault state.

16. The system as claimed in claim 10, the system is further configured to:

when time for activating the engine quick torque control exceeds a time threshold or a difference between the engine conventional torque requirement and the engine quick torque requirement is less than a preset value, deactivate the engine quick torque control;

reset an engine quick torque flag;

send the engine quick torque control flag, an engine conventional torque requirement and the engine quick torque requirement to the engine; and respond to the engine conventional torque requirement by the engine, and taking the engine conventional torque requirement as a feed-forward value of a generator speed setting controller to control a generator.

* * * * *